United States Patent

[11] 3,604,128

| [72] | Inventor | Alfred J. Homann<br>Cinnaminson, N.J. |
|---|---|---|
| [21] | Appl. No. | 807,869 |
| [22] | Filed | Mar. 17, 1969 |
| [45] | Patented | Sept. 14, 1971 |
| [73] | Assignee | EDP-ECC Corporation<br>Washington, D.C. |

[54] SYSTEM MALFUNCTION ANALYSIS REINFORCEMENT TRAINER
20 Claims, 6 Drawing Figs.

| [52] | U.S. Cl. | 35/13 |
|---|---|---|
| [51] | Int. Cl. | G09b 25/02 |
| [50] | Field of Search | 35/10, 11, 13, 12 Q; 340/384, 384 E; 179/100.2 MI |

[56] References Cited
UNITED STATES PATENTS

| 3,251,142 | 5/1966 | Jazbutis | 35/11 |
|---|---|---|---|
| 3,309,793 | 3/1967 | Bartee | 35/10 |
| 3,310,883 | 3/1967 | Young | 35/10 |
| 3,456,363 | 7/1969 | Boxley | 35/13 |

Primary Examiner—Wm. H. Grieb
Attorney—Fishman and Van Kirk

ABSTRACT: A teaching machine characterized by visual displays and provision for active student response, the invention including an audio system for simulating sound effects associated with the problem being solved by the student. The invention also comprises a programmable meter which enables simulation of measurements which would be taken by a student on actual equipment under various conditions and a clock circuit which enables dynamic programming of the apparatus.

FIG. I

INVENTOR.
ALFRED J. HOMANN
BY Fishman and VanKirk
ATTORNEYS

SYSTEM MALFUNCTION ANALYSIS REINFORCEMENT TRAINER

BACKGROUND OF THE INVENTION

1. Field of the Invention

The present invention relates to the field of education. More specifically, the present invention is directed to training devices which present problems to students by means of visual and audible displays and demand active responses from the student. Accordingly, the general objects of the present invention are to provide novel and improved methods and apparatus of such character.

2. Description of the Prior Art

A trainer of the general type with which the present invention is concerned is disclosed in U.S. Pat. No. 3,310,883, issued Mar. 28, 1967 to G. H. Young. Briefly, trainers or teaching machines such as that disclosed in the Young patent present problems to students in the form of visual (graphic) displays. Such displays may be in the form of a projected image and/or a template carrying a pictorial presentation. Prior art trainers also provided the student with a plurality of manual actuatable devices, typically pushbutton type switches, whereby the student would make an active response to the presentation. When the student makes the correct response, at least a part of the presentation will change thereby providing an immediate indication as to whether or not the student's reaction was correct.

In order to provide desired flexibility, the prior art trainers could be programmed and the displays to be presented to the student changed whereby malfunction analysis on an almost infinite number of types of equipment could be performed and numerous malfunctions could be simulated for each type of equipment. It is also noteworthy that the problems presented to the student could, with equipment such as that exemplified by the aforementioned Young patent, be changed merely by removal and insertion of a prewired "program" which plugs into the trainer and/or by insertion of a new graphic display. In the case of the trainer shown in the Young patent, the apparatus is programmed merely by reconfiguring the direct connections between a plurality of contacts on a changeable plug board; all active components of the trainer being included in the main assembly and not being subject to alteration, manipulation or rewiring.

Since the introduction of programmable trainers, a desire has arisen for programmable meter displays to be associated with those programs wherein the student would, when operating on the equipment being simulated, perform a series of test which require reading or employment of a sensor and associated meter. A desire has also evolved for the addition of an audible presentation to the student so as to enhance realism. Finally, it has been deemed desirable to provide "dynamic programming" wherein the presentation to the student would be active and/or automatically vary with time.

SUMMARY OF THE INVENTION

The present invention fulfills the above briefly discussed and other desires and, in so doing, provides for the addition of any or all of a clock circuit, a programmable meter circuit or a multitrack audio circuit to a teaching machine. In a preferred embodiment, the clock circuit includes an oscillator and suitable logic to provide a plurality of alternating currents at different frequencies. In the case of the programmable meter, the present invention provides for a meter mechanism having a readily removable and replaceable scale and for circuitry which provides for meter deflection in stepwise fashion up to 100 percent of full scale. In the case of the sound system, the present invention provides for a plurality of channels of sound which will be selectively reproduced.

BRIEF DESCRIPTION OF THE DRAWINGS

The present invention may be better understood and its numerous objects and advantages will become apparent to those skilled in the art by reference to the accompanying drawing wherein like reference numerals refer to like elements in the various figures and in which.

DESCRIPTION OF THE PREFERRED EMBODIMENTS

Figure 1:
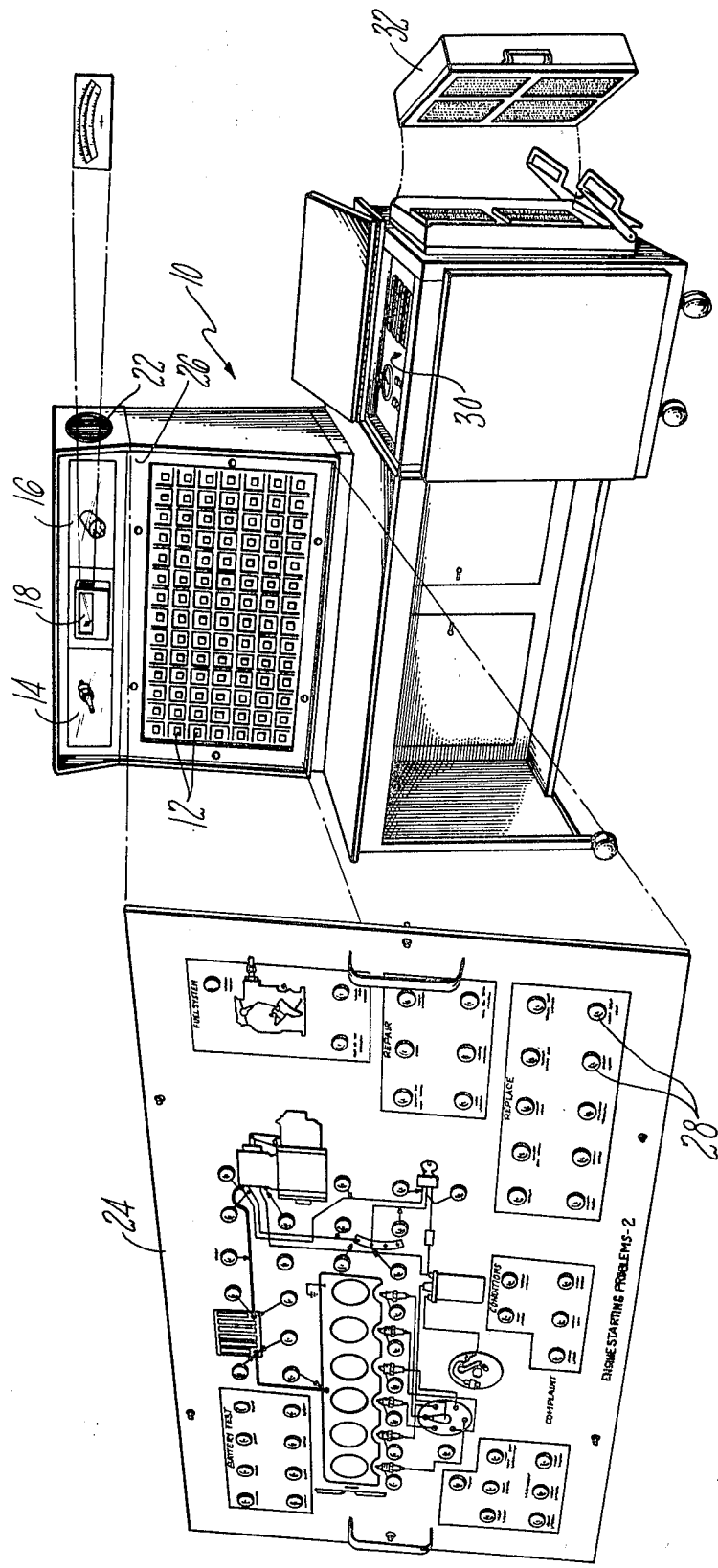
FIG. 1 is an exploded, perspective view of a preferred embodiment of a trainer in accordance with the present invention.
Figure 3:
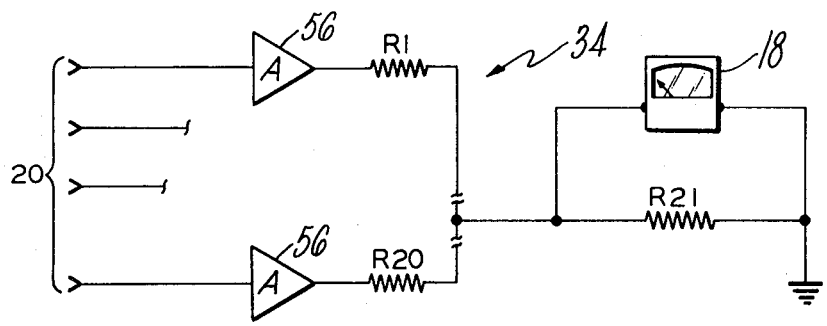
FIG. 3 is a schematic view of a programmable meter circuit for use in the trainer shown in FIG. 1.
Figure 4A:
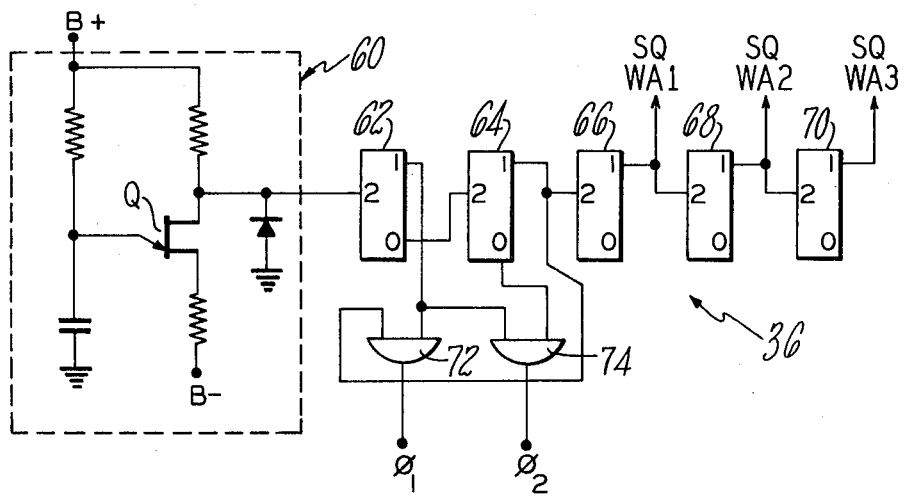
FIG. 4A is a schematic showing of a clock circuit which may be included in the trainer shown in FIG. 1.
Figure 4B:
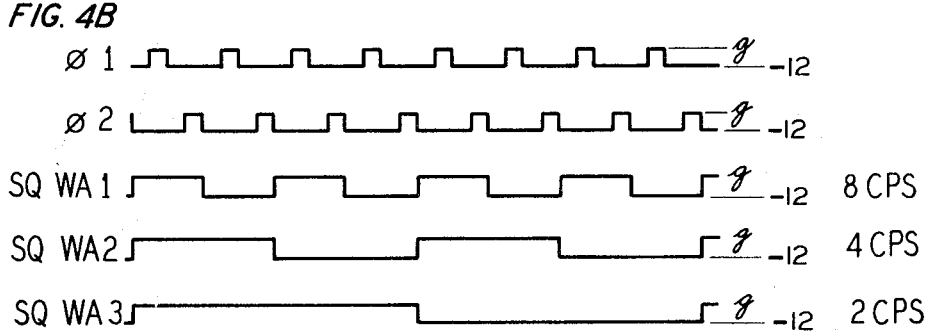
FIG. 4B depicts the output waveforms provided by the clock circuit of FIG. 4A.
Figure 5:
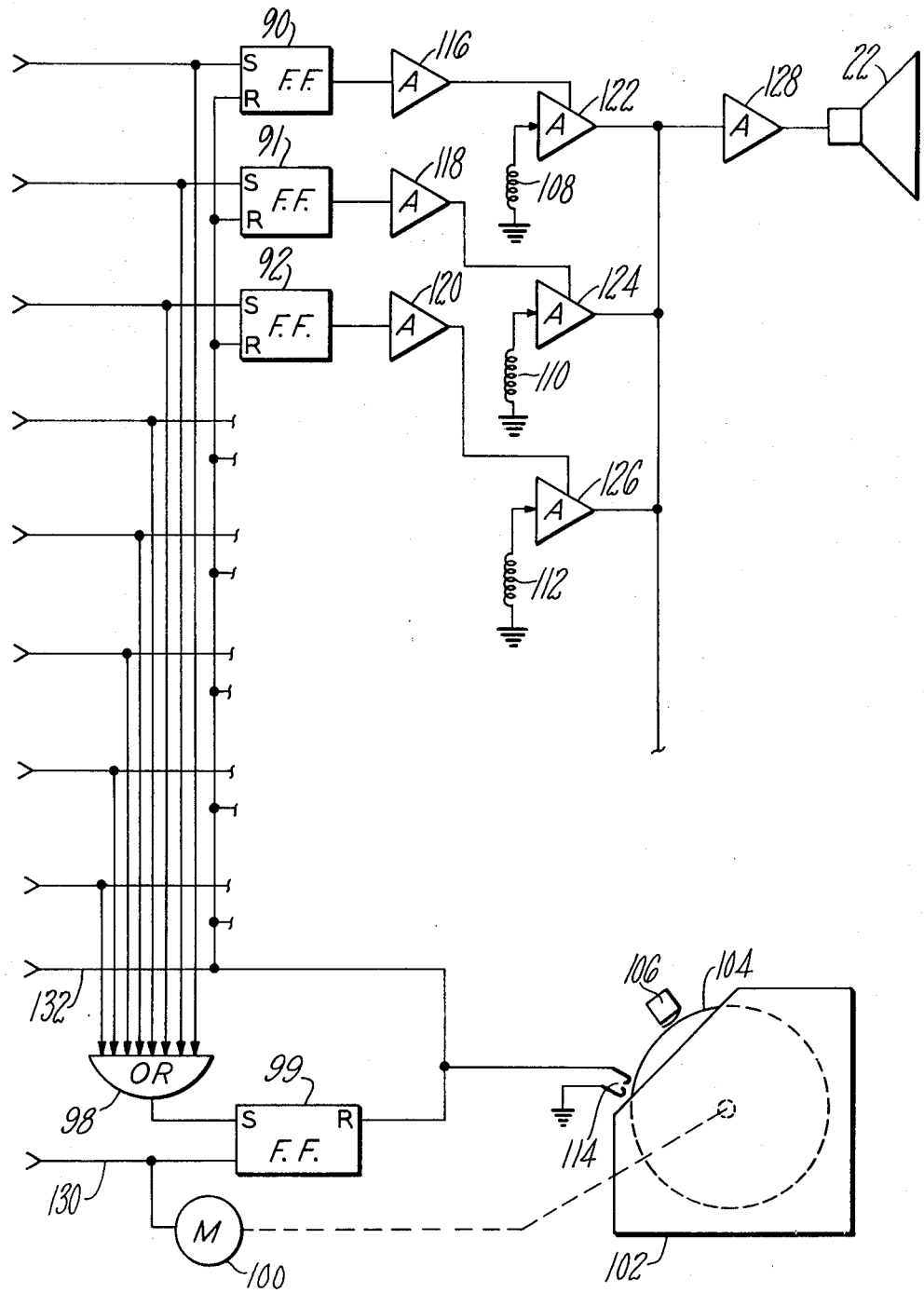
FIG. 5 is a block diagram of a multichannel audio system which may be incorporated in the trainer of FIG. 1.

The general composition and operation of the trainer shown in FIG. 1, with the exception of the subsystems depicted in FIGS. 3–5, is disclosed in and may be understood from a study of Young U.S. Pat. No. 3,310,883. Briefly, the trainer comprises a main console 10 which includes a plurality of actuator-indicators 12. Actuator-indicators 12 comprise pushbutton-type electric switches and lamps integral therewith. The console also comprises at least a pair of slide projectors, not shown, which project preselected images on screens 14 and 16. Positioned between screens 14 and 16 is a programmable meter 18. Meter 18 is characterized by the provision for inserting preselected cards 20 having various scales thereon behind the meter movement. Console 10 also has mounted therein a speaker 22 which forms a portion of the audio circuit.

In addition to the graphic displays provided on screens 14 and 16 by the slide projectors, the trainer of FIG. 1 also includes removable front overlay panels, such as panel 24, which may be snapped into position over the subpanel 26 on which are mounted actuator-indicator switches 12. Panels 24 cover all of the actuator-indicator switches on the subpanel except those required to simulate the particular system being taught. In the representative case shown in FIG. 1, a student will be taught to detect and rectify problems associated with the starting of internal combustion engines. The exposed actuator-indicator switches will represent indicators, test points, and components to be used by the student operating the trainer. It is to be noted that the actuator-indicator switches 12 have the capability of displaying any one of four colors at any time and, in the typical case, will be operated by depressing a transparent plastic insert, such as insert 28, which is mounted in panel 24.

The trainer of FIG. 1 also comprises an instructor's panel, indicated generally at 30, by means of which an instructor may present varying conditions to the student and also score the student by means of counters which record the number of tests or replacements performed by the student and the elapsed time. A program plug board 32 is plugged into the console at the side of the instructor's panel and, in combination with the graphic display on panel 24 and the slide trays which are inserted into the slide projectors, determines the system or type of equipment to be simulated in and the simulated malfunctions to be presented to the student. The plug-in program provides instant access memory which in turn provides immediate feedback to the student on the console displays.

Figure 2:
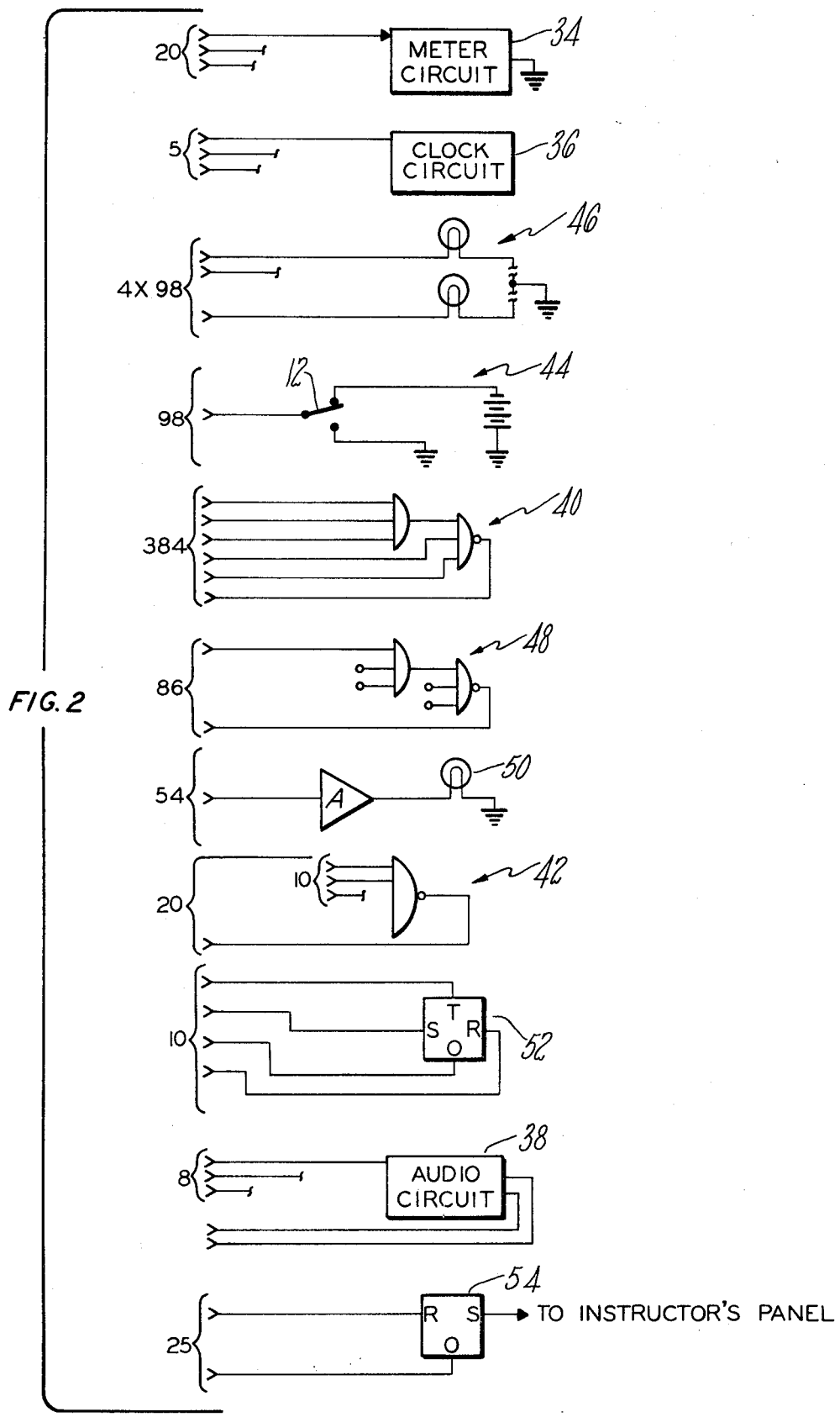
FIG. 2 is a schematic showing depicting the circuitry which comprises a permanent part of the trainer shown in FIG. 1.

Referring now to FIG. 2, the circuitry which is included within console 10 of the trainer shown in FIG. 1 is shown very schematically. The connections at the left side of FIG. 2 indicate the number of terminals provided for the various subsystems at the connector board on the side of the instructor's panel into which the prewired program plug boards 32 are inserted. Thus, there are 20 inputs to the circuitry 34 which is associated with meter 18, five signals delivered to the connector board from the clock circuit 36 and ten connectors for audio circuit 38. The route of the signals to the meter and audio circuits and from the clock circuit to the desired components is, of course, determined by the prewired program and is controlled by the student through depression of actuator-indicator switches 12. With minor exception, the remainder of the circuitry depicted in FIG. 2 and possible interconnections therebetween may be seen from Young U.S. PAT. No. 3,310,883. Thus, for example, the gating circuit indicated generally at 40 in FIG. 2 is shown in FIG. 7 of the Young patent, there being 384 such gating circuits in console 10. Similarly, mixer circuit 42 of FIG. 2 is shown in FIG. 9 of Young U.S. PAT. No. 3,310,883, there being 20 such mixer circuits in console 10. The 98 switches indicated generally at 44 in FIG. 2 represent the actuator-indicator switches 12 of FIG. 1 and the 392 lights, one of which is indicated at 46, represent the four lamps incorporated in each of said 98 actuator-indicator switches.

Reference numeral 48 indicates one of 86 identical logic gates in console 10 which function as inverters. One of the 54 projector lamps of the two slide projectors is shown at 50; each projector having 27 selectively energizeable lamps and slide magazines having a commensurate number of slides. One of 10 toggling flip-flop circuits is indicated at 52 while 54 indicates one of 25 additional multivibrator circuits. The set inputs of multivibrators 54 are connected to switches on the instructor's panel and these circuits are used by the instructor to simulate malfunctions. By proper wiring of the program, the multivibrators 54 will be reset only when the student closes the one of actuator-indicator switches 12 commensurate with the proper corrective action for the simulated malfunction.

The operation of the trainer; with the exception of the meter, clock and audio circuits; is believed to be fully described in the Young patent and detailed discussion thereof will be included herein. Briefly, however, the wiring of the program board 32 interconnects the switches, individual logic circuits and indicators in such a manner as to produce an overall digital logic system which, in response to simulated malfunction commands from the instructor, will activate certain indicator devices via multivibrators 54 and the other interconnected logic circuits. Student reaction to the simulated malfunctions will, through the logic system, remove the simulated malfunction only when the student finds the switch which will cause resetting of the multivibrator.

Referring now to FIG. 3, the programmable circuit which includes meter 18 is shown schematically. The meter circuit comprises 20 connectors at the board into which the program 32 is inserted. Through the wiring configuration in the program, the 20 meter circuit inputs will be connected through logic to respective of said actuator-indicator switches 12 whereby the closing of one of said switches 12 will cause application of a gating signal to one of a plurality of identical amplifiers 56 in the meter circuit. The outputs of amplifiers 56 are applied to respective resistors R1-R20. The 20 resistors R1-R20, are precision resistors connected in additive relationship. The resistors are sized so that the outputs of amplifiers 56 will be attenuated in such a manner that the meter will be deflected from full scale to 5 percent of full scale in 20 steps. Thus, when the actuator-indicator switch associated with the circuit including resistor R1 and its associated amplifier is depressed, the amplifier will be turned on and meter 18 deflected full scale. However, when the indicator-actuator switch associated with the circuit including resistor R-20 is depressed, meter 18 will be deflected 5 percent of full scale. The wired program often provides the ability to gate on a plurality of amplifiers 56 serially whereby signals developed across resistors R1-R20 may be added so as to indicate preselected conditions. As noted above, the scales 20 across which the needle on meter 18 moves are interchangeable to simulate various instrument readings, the meter scale being separated from the needle and meter movement by suitable means such as a glass window so that accidental contact between the removable scales and the needle pointer cannot occur. Resistor R21 merely shunts meter 18 in the manner common in the art.

FIG. 4A depicts a clock circuit which may be incorporated in the trainer of FIG. 1 to provide for dynamic programming. The clock circuit comprises a free-running oscillator 60 including unijunction transistor Q1. The output of oscillator 60, which will typically be a square wave at 32 c.p.s., is applied to a pulse division circuit comprising five multivibrator circuits 62, 64, 66, 68 and 70 connected in series. OUtputs are taken from multivibrators 66, 68 and 70 of the divider chain to provide the respective waveforms indicated as square waves 1, 2 and 3 (SQ wa1, SQ wa2 and SQ wa3) in FIG. 4B. Outputs from multivibrators 62 and 64 are also applied to AND gates 72 and 74 to provide a pair of signals $\Phi 1$ and $\Phi 2$ which are 180° out of phase and at double the frequency of square wave 1 provided at the output of multivibrators 66.

The five output signals from the clock circuit of FIG. 4A are constantly available at the connector board on the side of the instructor's panel and may be interconnected through the wired program 32 so as to control circuitry within the console. Thus, for example, if a student is being taught to locate and correct automobile electrical system problems, the outputs of the clock circuit may be caused to control a simulated turn signal indicator which will flash in a manner commensurate with the malfunction being simulated. Thus, if it is desired to have the signal flash at a decreasing rate as the trouble persists and the student does not make a proper diagnosis, the program will be wired so as to connect several of logic gates 40 in crisscross thereby forming a counter (shift register) comprised of a plurality of flip-flop circuits. The output of the shift register will, after a preselected number of flashes, switch the signal lamp (one of lamps 46) from the output of multivibrator 68 to the output of multivibrator 70. Similarly, if a burnt out turn signal lamp was to be simulated, the outputs of multivibrators 66 and gate 74 might be added, through the logic configuration determined by the wired program, to simulate a lamp which flashes at two levels of intensity.

An audio system which enables an audible simulation which varies with the malfunction being simulated and the student's reaction thereto is shown in FIG. 5. As in the case of the meter circuit, the audio circuit has a plurality of inputs which may be energized by the student when he depresses one of indicator-actuator switches 12 on the console panel. Depression of an indicator-actuator switch will, in the manner to be described below, cause setting of one of a plurality of bistable multivibrator circuits, three such circuits being shown in FIG. 5 at 90, 91 and 92. It is to be understood that there will be an input multivibrator circuit for each channel of audio information stored in the trainer, eight input channels being shown in FIG. 5 for purposes of illustration. Each of the eight inputs is also applied to an OR gate 98 which in turn causes setting of bistable multivibrator circuit 99. The setting of multivibrator 99 will cause a tape drive motor 100 to be turned on, the drive motor engaging a standard magnetic tape magazine 102. The setting of multivibrator 99 will also, through logic gates made responsive thereto by the prewired program, inhibit the inputs to multivibrators 90–97 whereby it is impossible to energize more than one sound track at one time.

Tape magazine or cartridge 102 includes a continuous tape loop and employs a magnetic tape 104 having a plurality of parallel sound tracks recorded thereon. In the example being described, tape 104 will have eight parallel tracks. The length of the tape loop may be selected at will, a 30 second playing time having been found desirable for many purposes. When driven by motor 100, the tape 104 will travel past a pickup head 106 including eight magnetic pickup elements oriented parallel to one another and transversely of the tape. Three of the pickup elements are indicated as coils 108, 110 and 112.

Tape 104 also includes a band or strip of conductive material which, when the entire loop has made one revolution past head 106, will cause the closing of a pair of contacts 114. The closing of contacts 114 grounds the reset input to multivibrator 99 thereby resetting this circuit and turning off motor 100; there being sufficient delay in the resetting of multivibrators 100 so that the conductive strip clears contacts 114 and the beginning of the sound tracks are again adjacent head 106. Contacts 114 are also connected to the reset inputs of the input multivibrators 90–97 and thus will cause resetting of these circuits at the end of a play of one of the sound tracks.

The setting of one of the input multivibrators, simultaneously with the energization of drive motor 100, also gates on one of a plurality of amplifiers 116, 118 or 120. The output of the amplifier which is gated on by the setting of an input multivibrator will bias on one of preamplifiers 122, 124 or 126. Preamplifiers 122, 124 and 126 are respectively connected to pick up elements 108, 110 and 112 and thus the preamplifier which is turned on as a result of the setting of one of the input multivibrators will cause the sound track recorded on the tape track aligned with its pick up element to be delivered to amplifier 128 and thence to speaker 22.

To summarize operation of the audio circuit, when the student depresses one of actuator-indicator switches 12 which calls for sound, a signal will be delivered through a logic gate as determined by the wired program. If this gate is not inhibited by a signal indicative of energization of another sound track, the signal will allow the motor 100 to turn on and the sound track commensurate with the student's response to be heard. Simultaneously, if desired, a signal will be provided by the audio circuit on conductor 130 which may be delivered via the logic to one of projector lamps 50. The sound track may thus give oral instructions and the trainer will simultaneously provide a pictorial presentation commensurate therewith. When the sound track has played, and unless the console logic as determined by the wired program calls for a replay, the audio circuit will shut off as above described and the multivibrator circuits which have been inhibiting the inputs to the seven nonselected audio channels will be reset by the signal (ground) momentarily appearing on conductor 132.

While a preferred embodiment has been shown and described, various modifications and substitutions may be made thereto without departing from the spirit and scope of the present invention. Thus, for example, while the circuitry of FIGS. 3–5 have been explained in relation to digital system such as that shown in the Young patent, these subsystems are also applicable to teaching machines which operate on an analog principle Accordingly, it is to be understood that the present invention has been described by way of illustration and not limitation.

What I claim is:

1. A programmable trainer comprising:
   means for providing a changeable, visible simulation of the subject of a lesson;
   a plurality of student operable actuators, said actuators having a predetermined relationship with the lesson subject;
   means storing a plurality of channels of audio information;
   a plurality of bistable devices, each of said devices, each of said devices being responsive to operation of one of said certain of said actuators and providing an output signal indicative of operation of its associated actuator;
   a plurality of preamplifier means, said preamplifier means being connected to respective of said bistable devices and being gated on by output signals provided thereby;
   a plurality of transducers, said transducers being connected to respective of said preamplifier means and being responsive to movement of said storing means for providing a plurality of signals commensurate with the stored audio information;
   gating means responsive to operation of any single one of said certain of said actuators for providing an output signal commensurate with operation of said any one of said actuators;
   motor means connected to said gating means and responsive to output signals provided thereby for causing movement of said storing means;
   amplifier means connected to the outputs of all of said preamplifier means; and
   loudspeaker means connected to the output of said amplifier means for reproducing the channel of audio information commensurate with the student operated actuator.

2. The trainer of claim 1 wherein said means for selectively reproducing audio information further comprises:
   means responsive to the energization of said motor means for providing a command signal to said visible simulation providing means whereby the visible display may be enhanced in a manner commensurate with the information provided in audible form.

3. The trainer of claim 1 wherein said means storing audio information comprises:
   a magnetic tape cartridge including a tape loop having a plurality of channels of information recorded thereon.

4. The trainer of claim 3 wherein said tape loop carries indicia to indicate completion of play of each of said channels and wherein said means for selectively reproducing audio information further comprises:
   means responsive to said completion of play indicia for disabling said motor means and resetting the bistable device commensurate with the audio channel just previously reproduced.

5. The trainer of claim 4 wherein said means for selectively reproducing audio information further comprises:
   means responsive to the energization of said motor means for providing a command signal to said visible simulation providing means whereby the visible display may be enhanced in a in a manner commensurate with the information provided in audible form.

6. The trainer of claim 1 further comprising: meter means, said meter means simulating conditions at various points on said visible simulation in response to operation of certain of said actuators.

7. The trainer of claim 6 wherein said meter means comprises:
   a meter having a movement and replaceable indicia bearing members, said members being insertable behind the movement-operated pointer;
   a plurality of meter drive circuits, said circuits being gated on individually in response to operation of individual of said actuators; and
   means applying the output signals provided by said plurality of drive circuits to said meter movement whereby meter deflection will be responsive to student reaction.

8. The trainer of claim 7 wherein said plurality of meter drive circuits comprise:
   a plurality of meter drive amplifier means responsive to actuator operation;
   means for selectively attenuating the output signals from said drive amplifier means, the output of each drive amplifier means being attenuated to a different degree whereby stepwise meter deflection is possible; and
   means interconnecting said attenuating means whereby the attenuated outputs of said drive amplifier means may be summed before application to said meter movement.

9. The trainer of claim 4 further comprising:
   meter means; said meter means simulating conditions at various points on said visible simulation in response to operation of certain of said actuators.

10. The trainer of claim 9 wherein said meter means comprises:
    a meter having a movement with associated pointer and replaceable indicia bearing members, said members being insertable behind the movement-operated pointer;
    a plurality of meter drive circuits, said circuits being gated on individually in response to operation of individual of said actuators; and
    means applying the output signals provided by said plurality of drive circuits to said meter movement whereby meter deflection will be responsive to student reaction.

11. The trainer of claim 10 wherein said plurality of meter drive circuits comprise:

a plurality of meter drive amplifier means responsive to actuator operation;

means for selectively attenuating the output signals from said drive amplifier means, the output of each driver amplifier means being attenuated to a different degree whereby stepwise meter deflection is possible; and means interconnecting said attenuating means whereby the attenuated outputs of said driver amplifier means may be summed before application to said meter movement.

12. The trainer of claim 11 further comprising: clock generator means for providing a plurality of timing signals at different frequencies, said timing signals being applicable to said visual simulation providing means to provide an indication that varies with time.

13. The trainer of claim 1 further comprising:

clock generator means for providing a plurality of timing signals at different frequencies, said timing signals being applicable to said visual simulation providing means to provide an indication that varies with time.

14. The trainer of claim 13 wherein said clock generator comprises:

an oscillator circuit; and a frequency division circuit connected to said oscillator circuit output and providing a plurality of signals at different frequencies.

15. A programmable trainer comprising:

a plurality of electrical switch means;

a plurality of visually changeable indicators;

a changeable overlay carrying program graphics and bearing indicia relatable to said switch means;

a plurality of gating units having circuits adapted for selective connection with said switch means and indicators;

readily changeable program plug board means providing circuitry interconnecting certain of said circuits with certain of said switch means and indicators in correspondence with the program graphics;

magnetic tape means for storing a plurality of channels of audio information; and means responsive to operation of certain of said switch means for selectively reproducing channels of said stored audio information, said audio information-reproducing means being controlled by said switch means via said gating unit circuits in accordance with the program determined by said plug board means.

16. The trainer of claim 15 wherein said means for selectively reproducing audio information comprises:

a plurality of bistable devices, each of said devices being responsive to operation of one of said certain of said switches and providing an output signal indicative of operation of its associated switch;

a plurality of preamplifier means, said preamplifier means being connected to respective of said bistable devices and being gated on by output signals provided thereby;

a plurality of transducers, said transducers being connected to respective of said preamplifier means and being responsive to movement of said storing means for providing a plurality of signals commensurate with the stored audio information;

gating means responsive to operation of any of said certain of said switches for providing an output signal commensurate with operation of any of said switches;

motor means connected to said gating means and responsive to output signals provided thereby for causing movement of said storing means;

amplifier means connected to the outputs of all of said preamplifier means; and loudspeaker means connected to the output of said amplifier means.

17. The trainer of claim 15 wherein at least one of said indicators comprises:

programmable meter means, said meter means simulating conditions at various points on the program graphics in response to operation of certain of said switch means, control of said meter means being via said gating unit circuits in accordance with the program determined by said plug board means.

18. The trainer of claim 16 wherein at least one of said indicators comprises;

programmable meter means, said meter means simulating conditions at various points on the program graphics in response to operation of certain of said switch means, control of said meter means being via said gating unit circuits in accordance with the program determined by said plug board means.

19. The trainer of claim 18 wherein said meter means comprises:

a meter having a driven movement with associated pointer and replaceable indicia bearing members, said members being insertable behind the movement-operated pointer;

a plurality of meter drive circuits, such circuits being gated on individually in response to operation of individual of said actuators; and means applying the output signals provided by said plurality of drive circuits to said meter movement whereby meter deflection will be responsive to student reaction.

20. The trainer of claim 19 wherein said plurality of meter drive circuits comprise:

a plurality of meter driver amplifier means responsive to actuator operation;

means for selectively attenuating the output signals from said driver amplifier means, the output of each driver amplifier means being attenuated to a different degree whereby stepwise meter deflection is possible; and means interconnecting said attenuating means whereby the attenuated outputs of said driver amplifier means may be summed before application to said meter movement.